United States Patent
Baumann

[11] Patent Number: 5,868,039
[45] Date of Patent: *Feb. 9, 1999

[54] VEHICLE OPERATING PEDAL ASSEMBLY

[75] Inventor: Hans-Uwe Baumann, Stuttgart, Germany

[73] Assignee: Dr. Ing-H.C.F. Porsche AG, Weissach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 620,533

[22] Filed: Mar. 25, 1996

[30] Foreign Application Priority Data

Mar. 30, 1995 [DE] Germany ................. 195 11 716.6

[51] Int. Cl.⁶ ................. G05G 1/14; B60T 7/04
[52] U.S. Cl. ................. 74/512; 74/560
[58] Field of Search ................. 74/512, 579 R, 74/579 E, 560; 92/190, 160

[56] References Cited

U.S. PATENT DOCUMENTS

| | | | |
|---|---|---|---|
| 1,294,538 | 2/1919 | Rose | 92/160 X |
| 1,637,765 | 8/1927 | Comstock | 92/160 X |
| 2,884,803 | 5/1959 | Willis | 74/512 |
| 3,988,945 | 11/1976 | Fasano | 74/512 |
| 4,913,001 | 4/1990 | Watanabe et al. | 74/579 |
| 5,289,758 | 3/1994 | Berlinger | 92/190 |
| 5,520,068 | 5/1996 | Karch | 74/512 |

FOREIGN PATENT DOCUMENTS

| | | | |
|---|---|---|---|
| 601018 | 2/1926 | France . | |
| 32334 | 11/1927 | France . | |
| 47746 | 6/1937 | France . | |
| 1300937 | 7/1962 | France . | |
| 81912 | 10/1963 | France . | |
| 2696397 | 4/1994 | France . | |
| 2923027 | 2/1985 | Germany | 74/512 |
| 4112133 | 10/1991 | Germany | 74/512 |
| 4226352 | 2/1993 | Germany | 74/512 |
| 4314858 | 11/1993 | Germany | 74/512 |
| 4406384 | 9/1995 | Germany . | |
| 60-135329 | 7/1985 | Japan | 74/512 |
| 5-282061 | 10/1993 | Japan | 74/512 |
| 6-95753 | 4/1994 | Japan | 74/512 |

*Primary Examiner*—Vinh T. Luong
*Attorney, Agent, or Firm*—Evenson, McKeown, Edwards & Lenahan P.L.L.C.

[57] ABSTRACT

For connecting a pedal, particularly a brake pedal, with a pressing rod, a connecting device includes a pin which has a spherical construction in the center area. With this construction of the pin, the pedal is held in a deflectable manner with respect to the pressing rod.

16 Claims, 1 Drawing Sheet

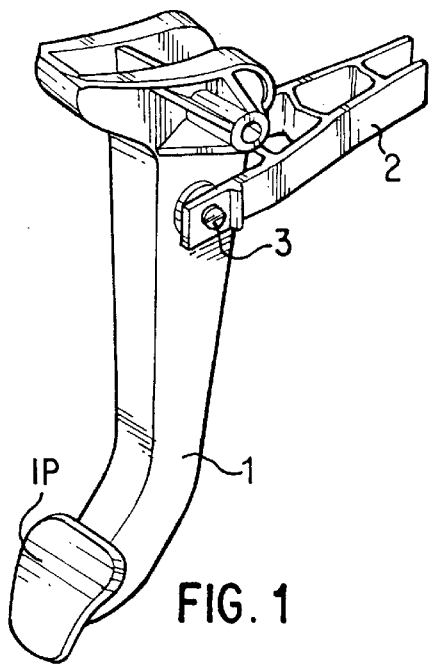
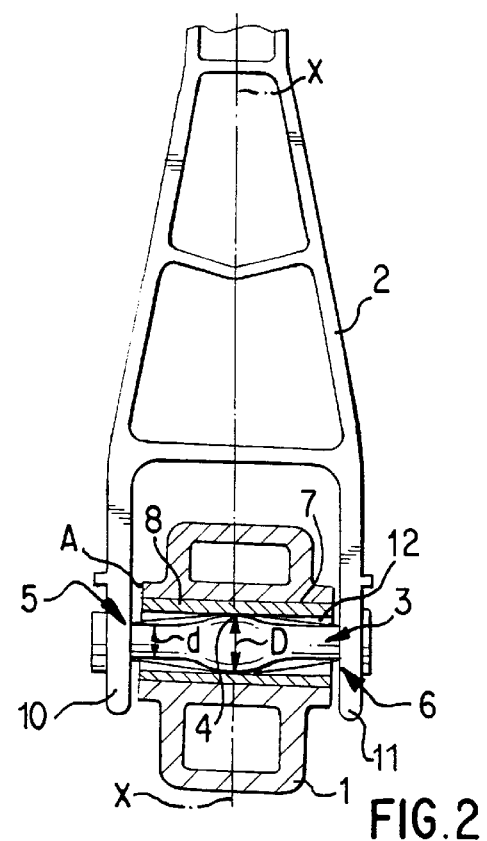
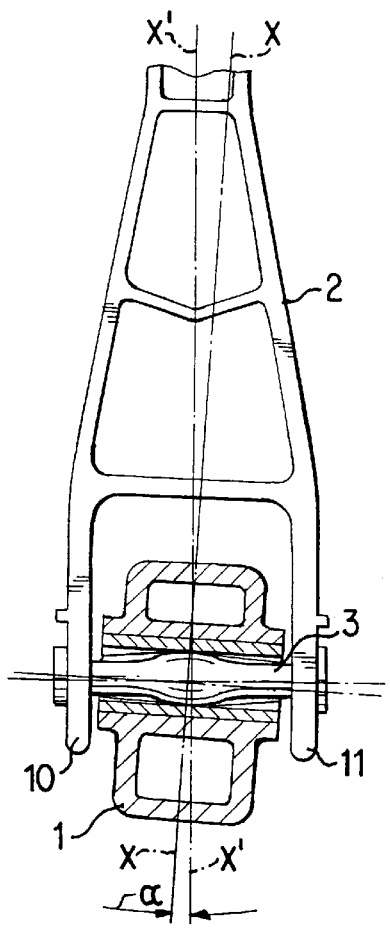
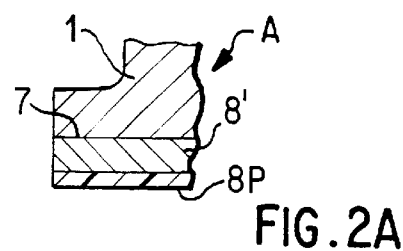
FIG. 1
FIG. 2
FIG. 2A
FIG. 3

VEHICLE OPERATING PEDAL ASSEMBLY

BACKGROUND AND SUMMARY OF THE INVENTION

This invention relates to a device for connecting a pedal with a pulling rod and/or pressing rod of a brake system by means of a pin.

From German Patent Document DE 43 14 858 A1, a hinge is known for doors, covers and the like for vehicles. This hinge comprises a hinge pin on which a ball element is arranged which carries a hinge arm.

It is an object of the invention to provide a simple bearing between a pedal and a pressing pulling and/or pressing rod which permits pendulum movements of the components with respect to one another.

According to the invention, this object is achieved by providing a device for connecting a pedal, particularly a brake pedal, with a pulling and/or pressing rod by means of a pin, wherein the pin has a spherically constructed center part and free pin ends having a smaller diameter than the spherical center part.

Principal advantages achieved by means of the invention are that a pin having a spherical center part is used as the connecting element. The pin can be manufactured in a simple manner and at reasonable cost. By way of a pin, a compensation can take place of angle defects between the two components to be connected with one another, as, for example, a brake pedal with a pressing rod for a brake system. The spherical shape of the pin allows a pendulum movement angular pivotal of the pedal with respect to the rod or of the rod with respect to the pedal.

As a result of the pin, alignment defects of the parts with respect to one another or deformations under a high load cannot be introduced as a bending moment into the rod which would result in a buckling and therefore in a failure of the brake system.

The costs for producing the pin are extremely low because a pin and a bearing bush are required anyhow for the swivellable connection between the pedal and the rod and only the spherical shape must be provided instead of a constant diameter on the pin.

For compensating angle defects, pins are also contemplated which are constructed as truncated cones on both sides so that only the center area of the pin has an outside diameter corresponding to the inside diameter of the bearing bush.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a pedal with a pulling and/or pressing rod connected by way of a pin constructed according to preferred embodiments of the invention;

FIG. 2 is an enlarged representation of the pin connection of the pedal assembly of FIG. 1;

FIG. 2A is an enlarged representation of feature "A" from FIG. 2;

FIG. 3 is a representation of the connection between the pedal and the rod when swivelled at an angle.

DETAILED DESCRIPTION OF THE DRAWINGS

FIG. 1 illustrates a vehicle operating pedal assembly including a brake pedal member 1 with a pulling and/or pressing rod 2 which are swivellably connected with one another by means of a pin 3. A vehicle operator engageable pedal 1P is formed on the brake pedal member 1 at a spacing from the pivotal connection of the pedal member 1 and the rod 2.

The pin 3 is constructed in one piece with a spherical center part 4 which has the largest diameter D in the center plane X—X. In the direction of the free ends 5, 6, the pin 3 is provided with a smaller diameter d.

In the bore 7 of the brake pedal member 1, a bearing bush 8 is arranged which consists of steel with an interior coating 8P made of a plastic material. By means of its spherical center part, the pin rests directly on the inner surface of the bearing bush 8.

As illustrated in detail in FIG. 3, as a result of the spherical construction of the pin 3, the rod 2 can carry out a deflection angular pivotal tilting movement, alpha ($\alpha$) between positions X—X and X'—X' with respect to the pedal 1. This movement may amount to up to $\alpha = 5°$ according to preferred embodiments. The spherical shaping of hit center part 4 of the pin may also consist of two mutually abutting truncated cones which, in the meeting area, have the diameter D, which is not shown in detail.

For the connection with the pedal member 1, the pressing rod 2 has a fork head with two legs 10, 11 which reach around the pedal member 1 with play from the outside. The pin 3 is held by means of cylindrical ends in bores of the legs 10, 11. Because of free space 12 obtained between the bearing sleeve 8 and the spherical center part 4, a angular pivotal tilting movement (X—X to X'—X') can take place within limits between the components—pedal member 1 and rod 2—connected by means of the pin 3.

The pin 3 may also consist of a sleeve element which is correspondingly shaped with a spherical center part. For the bearing of a cylindrical pin 3A, the sleeve 8A may also be constructed with a spherical center part.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle operating pedal assembly, comprising:
   an operating rod,
   a pedal member having a pedal engageable by a vehicle operator,
   and a pivotal connection arrangement connecting the rod and pedal member at a position spaced from the pedal,
   wherein said connection arrangement comprises a pivot pin supported in a bearing bush, one of said pivot pin and bearing bush having a curved center part of a first diameter and free end parts of a second diameter being different from said first diameter to accommodate limited angular pivotal tilting movement of the rod and pedal member about axes transverse to a pivot axis of said connection arrangement,
   wherein said pin has the curved center part, and
   wherein said bush has a cylindrical constant diameter cross-section along its length.

2. An assembly according to claim 1, wherein said bush is a steel sleeve bush with a plastic coating.

3. An assembly according to claim 2, wherein the rod comprises a fork head with two legs which reach around the pedal member with play from the outside.

4. An assembly according to claim 3, wherein said pedal member is a brake actuating pedal member and said pedal is a foot operated brake pedal.

5. An assembly according to claim 2, wherein said pedal member is a brake actuating pedal member and said pedal is a foot operated brake pedal.

6. An assembly according to claim 1, wherein said pedal member is a brake actuating pedal member and said pedal is a foot operated brake pedal.

7. An assembly according to claim 1, wherein the curved center part is a spherical center part.

8. An assembly according to claim 7, wherein said bush is a steel sleeve bush with a plastic coating.

9. An assembly according to claim 7, wherein the rod comprises a fork head with two legs which reach around the pedal member with play from the outside.

10. An assembly according to claim 7, wherein said pedal member is a brake actuating pedal member and said pedal is a foot operated brake pedal.

11. An arrangement for connecting a vehicle operating rod with a pedal member having a pedal engageable by a vehicle operator, said connection arrangement comprising:

a pivot pin which in use is carried by one of said operating rod and pedal member, a bearing bush which in use is carried by the other one of said operating rod and pedal member and surrounds and pivotally supports the pivot pin with an external bearing surface of the pivot pin in contact with an internal bearing surface of the bearing bush, wherein one of the pivot pin and bearing bush has a substantially constant cylindrical diameter along its length, and wherein the other one of said pivot pin and bearing bush has a curved center part of a first diameter and free end parts of a second diameter being different from the first said diameter to accommodate limited angular pivotal tilting movement of the rod and pedal member via an axis transverse to a pivot axis of said connection of said connection arrangement, and said curved center part is in contact with said internal bearing surface.

12. The arrangement according to claim 11, wherein the bearing bush is a steel bearing bush with a plastic coating along the internal bearing surface thereof.

13. The arrangement according to claim 12, wherein said pin has the curved center part, and wherein said bush has a cylindrical constant diameter cross-section along its length.

14. The arrangement according to claim 12, wherein said bush is a sleeve bush and the curved center part is spherical.

15. The arrangement according to claim 14, wherein said pin has the curved center part, and wherein said bush has a cylindrical constant diameter cross-section along its length.

16. The arrangement according to claim 11, wherein said bush is a sleeve bush and the curved center part is spherical.

* * * * *